USO05511895A

United States Patent [19]
Myers

[11] Patent Number: 5,511,895
[45] Date of Patent: Apr. 30, 1996

[54] TORQUE CONVERTER LOCKING ADAPTOR

[75] Inventor: John E. Myers, Reno, Nev.

[73] Assignee: Torque Converter Rebuilding, Inc., Reno, Nev.

[21] Appl. No.: 210,130

[22] Filed: Mar. 17, 1994

[51] Int. Cl.⁶ ..................................... F16B 2/14
[52] U.S. Cl. ................ 403/370; 403/371; 74/573 R
[58] Field of Search ................... 403/370, 369, 403/368, 367, 365, 371, 243, 299; 74/573 R; 29/901

[56] References Cited

U.S. PATENT DOCUMENTS

| 618,639 | 1/1899 | Bullard | 403/370 |
|---|---|---|---|
| 4,202,644 | 5/1980 | Soussloff | 403/369 |
| 4,425,816 | 1/1984 | Toyoda | 403/370 X |
| 4,600,334 | 7/1986 | Soussloff | 403/369 |
| 5,190,393 | 3/1993 | Svensson | 403/370 |
| 5,374,135 | 12/1994 | Folsom et al. | 403/369 |

FOREIGN PATENT DOCUMENTS 1656220   6/1991   U.S.S.R. ................... 403/370

*Primary Examiner*—Brian K. Green
*Assistant Examiner*—Harry C. Kim
*Attorney, Agent, or Firm*—Bielen, Peterson & Lampe

[57] ABSTRACT

The adaptor for locking the internal components of a torque converter including a mandrel or pin having first and second end portions. The first end portion of the mandrel extends into a torque converter opening to engage the internal components of the torque converter. A collet of the torque converter circumscribes the mandrel during this extension. An intermediate element having a hollow end portion is capable of fitting over the collet and the second end portion of the mandrel. An intermediate element is fastened or fixed to the mandrel which may be interchangeable, dependant upon the particular torque converter being stabilized. A bushing is interposed the intermediate element and the collet and maintained in this position such that the open hollow end portion of the intermediate element, the bushing, and the collet are sandwiched together.

6 Claims, 3 Drawing Sheets

TORQUE CONVERTER LOCKING ADAPTOR

BACKGROUND OF THE INVENTION

The present invention relates to a novel and useful torque converter locking adaptor, Torque converters employed with automatic transmissions include a variety of internal components which vary greatly according the model and make of the vehicle. During repair and rebuilding, it is necessary to balance the torque converter by spinning the same on a turning member. During this balancing procedure, the internal components of the torque converter must be stabilized by a mandrel which meshes or indexes with the internal components of the particular torque converter.

In the past, specific locking mandrels were used for each torque converter. This system was quite expensive and unwieldy.

An adaptor for locking a torque converter which uses interchangeable mandrels would be a notable advance in the automotive field.

SUMMARY OF THE INVENTION

In accordance with the present invention a novel and useful torque converter locking adaptor is herein provided.

The adaptor of the present invention utilizes a mandrel having a first end portion and a second end portion. The first end portion extends into the torque converter opening and engages the internal components, which must be stabilized in order to spin balance the torque converter following a repair or rebuilding of the same. The mandrel is encircled by a collet extending from the torque converter housing about the opening to the interior of the torque converter. Of course, the mandrel may include a particular first end portion which is compatible with the particular internal components of the subject torque converter.

An intermediate element is also employed in the present invention to support the mandrel. The intermediate element includes an open hollow end portion which is capable of fitting over the collet of the torque converter. The intermediate element of the hollow end portion is also capable of accepting a bushing such that the bushing is interposed the intermediate element and the collet of the torque converter. Holding means retains the hollow end portion of the intermediate support element, the bushing, and the collet in a sandwich configuration. The holding means may take the form of providing a threaded outer surface on the intermediate portion and constructing the holding means in the form of an annular member with an inner surface having a threaded portion that threadingly engages the threaded outer surface of the intermediate support portion. The hollow end portion of the intermediate element may be constructed with a multiplicity of flexible fingers that are sufficiently pliable to extend into a position against the bushing when the annular element is threadingly tightened on the outer surface of the intermediate element.

The mandrel is also detachable from the intermediate support element and is held to the same by a fastener which may take the form of a threaded screw. Thus, mandrels of different configurations may be employed in the adaptor of the present invention dependant on the type of torque converter being repaired or rebuilt.

It may be apparent that a novel and useful torque converter locking adaptor has been described.

It is therefore an object of the present invention to provide a torque converter locking adaptor which fixes the internal components of a torque converter during spin balancing of the same following repair or replacement.

It is another object of the present invention to provide a torque converter locking adaptor which is capable of being used on torque converters of various manufacturing types, sizes, and shapes originating with different manufacturers.

Yet another object of the present invention is to provide a torque converter locking adaptor which is easily secured to a torque converter hub without the use of O-rings and without marring or scratching the torque converter hubs.

A further object of the present invention is to provide a torque converter locking adaptor which employs mandrels or pins of various types and which are interchangeable relative to a support element and utilizes a small number of bushing types to effect the tightening between the mandrel and the intermediate support portion.

A further object of the present invention is to provide a torque converter locking adaptor which accurately locks or indexes internal components of a torque converter during the balancing of the same.

The invention possesses other objects and advantages especially as concerns particular characteristics and features thereof which will become apparent as the specification continues.

For a better understanding of the invention reference is made to the following detailed description of the preferred embodiments thereof which should be referenced to the prior described drawings.

DETAILED DESCRIPTION OF THE PREFERRED EMBODIMENTS

Various aspects of the present invention will evolve from the following detailed description of the preferred embodiments thereof.

Figure 1:
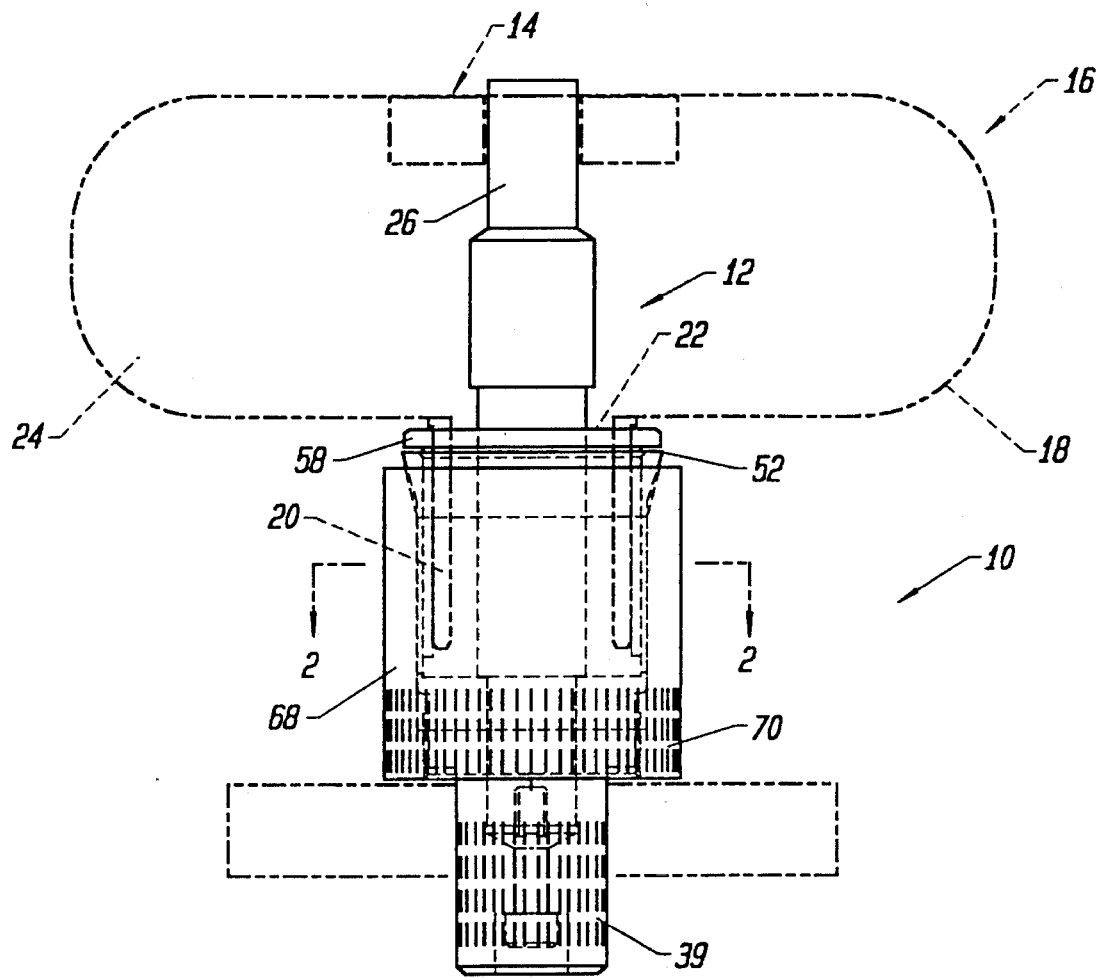
FIG. 1 is a top plan view of the torque converter locking adaptor of the present invention in place on a torque converter depicted schematically in part in phantom.
Figure 2:
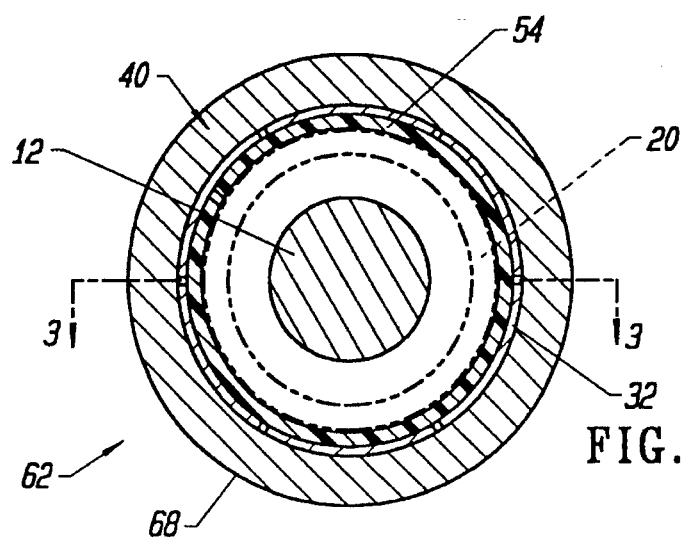
FIG. 2 is a sectional view taken along line 2—2 of FIG. 1.
Figure 4:
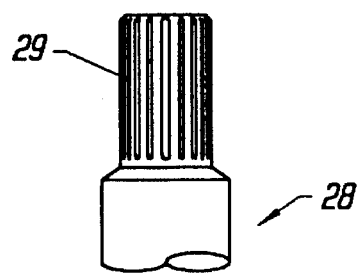
FIG. 4 is a front elevational view of a typical mandrel or pin end portion employed to index internal components of a torque convert.

The invention as a whole is depicted in the drawings by reference character 10. The adaptor 10 includes as one of its elements a mandrel 12 which is employed to lock or index internal components 14 of a torque converter 16, depicted in phantom on FIG. 1. Torque converter 16 includes a shell or hub 18 which terminates in a collet 20 surrounding an opening 22 to the interior 24 of hub 18. Mandrel or pin 12 may include an end portion 26, FIG. 1, which is capable of engaging internal components 14 of torque converter 16 when torque converter 16 is spun on a balancing device. Thus, adaptor 10 is symmetrically formed to aid in this endeavor. With reference to FIG. 4, it may be observed that a mandrel end portion 28 is depicted where a tip 29 includes a splined structure to engage internal components 14 of a torque converter 16 of a certain type. That is to say, torque converters of different sources of manufacture require different tips on mandrel 12 in order to index or lock the same.

Figure 3:
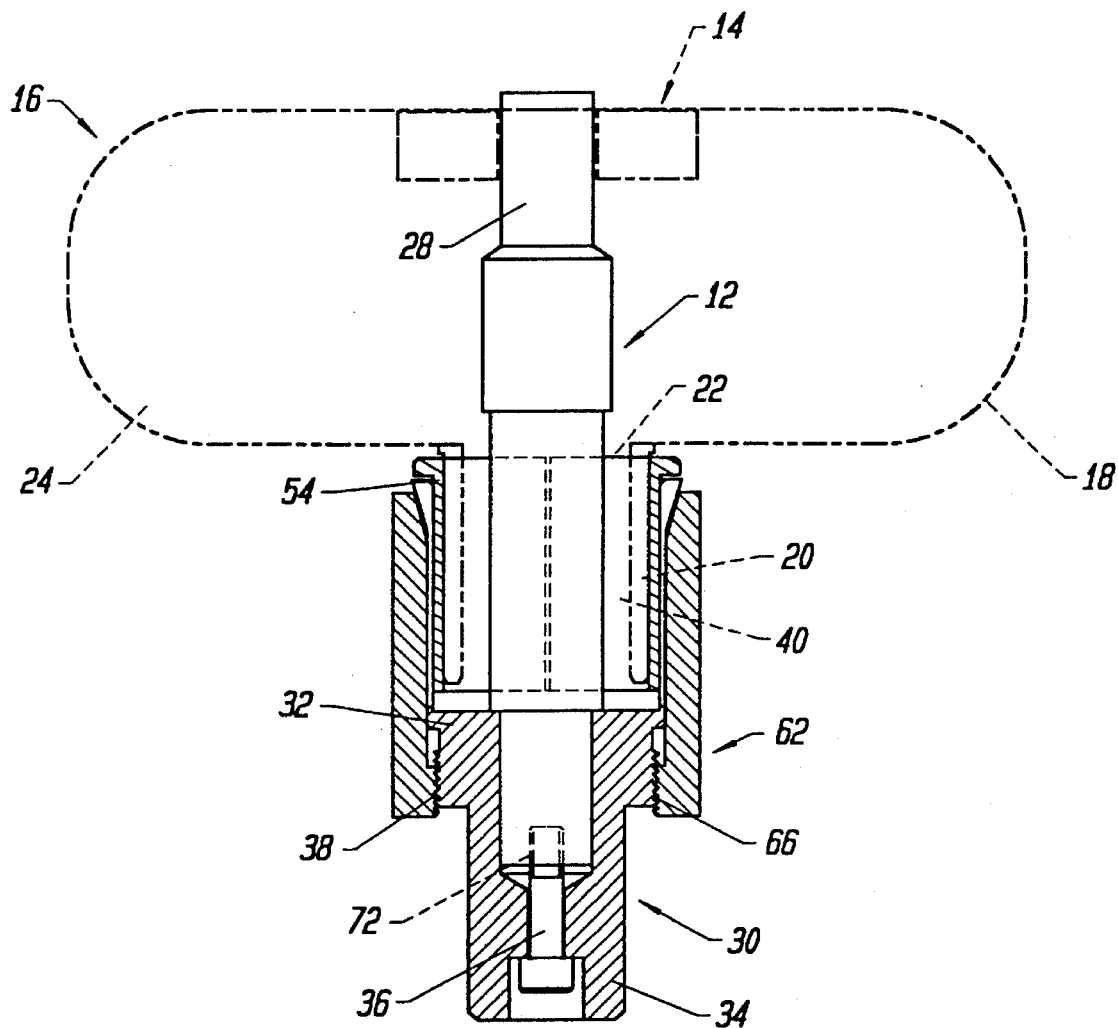
FIG. 3 is a sectional view taken along line 3—3 of FIG. 2.
Figure 5:
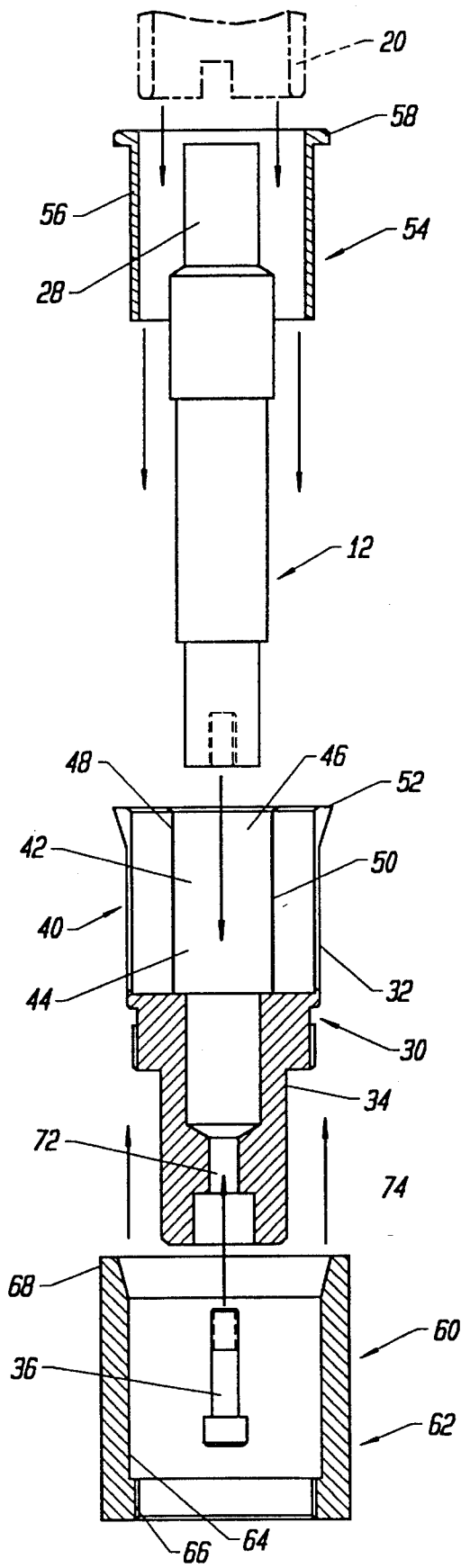
FIG. 5 is an exploded view depicting assembly of the components of the present invention which are shown in partial section.

Mandrel 12 is supported by an intermediate support element 30. Intermediate support element, FIG. 3 includes an open hollow end portion 32 and a narrowed end portion 34. Threaded screw fastener 36 holds mandrel 12 to intermediate support element 30. Thus, mandrels, such as mandrel 12, are interchangeable with respect to intermediate element 30. Mandrel 12 and intermediate element 30 may be constructed of metallic materials such as steel, stainless steel, and other suitable relatively rigid materials. Intermediate element 30 is formed with a threaded outer surface 38, FIG. 3, and a knurled gripping surface 39, FIG. 1. Open hollow end portion 32 of support element 30 possesses a plurality of flexible fingers 40 which extend outwardly from end portion 34. With reference to FIG. 5, exemplar finger 42 is depicted having a curved outer surface 44 which terminates in a flared tip 46. Finger 42 is separated from adjacent fingers by gaps 48 and 50. Turning again to FIG. 1, it may be observed that plurality of fingers 40 form a circular end 52 of end portion 32 of support element 30.

A bushing 54 is also employed in the present invention to fit within hollow end portion 32 and around collet 20 of hub 18. Bushing 54 may be constructed of a flexible plastic material such as Nylon, Teflon, and the like. Bushing 54 is formed with a cylindrical base 56 which terminates in a rim 58 that serves to limit the travel of bushing 54 within open hollow end portion 32 of support element 30. In other words, rim 58 is intended to contact circular end 52 of support member 30. Bushing 54 is sized to fit over collet 20, of the particular hub 18 being repaired or rebuilt, in a snug fashion.

Holding means 60 is also employed for retaining open hollow end portion 32 of intermediate support element 30, bushing 54, and collet 20 in a sandwich configuration. Holding means 60 is constructed, in the embodiments shown in the drawings, as an annular member 62 having an inner surface 64 with a threaded portion 66 that threadingly engages threaded outer surface 38 of support element 30. Annular member 62 also includes an outer surface 68 having a knurled portion 70, best shown in FIG. 1.

In operation, adaptor 10 is employed in conjunction with a torque converter 16 having a hub 18 terminating in a collet 20. Torque converter 16 includes internal components 14 depicted in phantom in FIG. 1. Mandrel 12 of a specific configuration is employed commensurate with the configuration of internal components 14 of torque converter 16. Mandrel 12 is attached to support element 30 by the use of threaded screw fastener 36 which engages a threaded surface 72 in cavity 74 of narrow end portion 34, FIG. 3. Bushing 54 is interposed the outside of collet 20 and open hollow end portion 32 of support element 30. Mandrel 12 attached to support element 30 then extends through collet 20, opening 22 to the interior 24 of hub 18. The end portion 28 of mandrel 12 is intended to index or lock the internal components 14 of torque converter 16. A tip, such as tip 29, FIG. 4, may be employed for this purpose. It should be noted that mandrel 12 may include a variety of tips commensurate with the type of torque converter 16 being rebuilt or repaired. Holding means 60 is employed to retain open hollow end portion 32 of support element 30, bushing 54, and collet 20 in a sandwich configuration. Holding means configured a annular member 62 is depicted in the drawings as having a threaded portion 66 which threadingly engages threaded portion 38 at the exterior of support element 30. Annular member 62 is sized such that flexible fingers 40 are forced inwardly against bushing 54, resulting in a very tight fit. This process is reversed for removal of adaptor 10 from toque converter 16. It should be emphasized that mandrel 12 may take many different formats dependant on the type of torque converter 16. It has been found that a relatively small number of mandrels 12 and bushings 54 of various types may be employed to index the internal parts of virtually all known torque converters.

While in the foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is

1. In combination, a torque converter and an adaptor for locking internal components of the torque converter possessing an outwardly extending collet surrounding an opening into the torque converter, said adaptor comprising:

a. a mandrel having a first end portion and a second end portion, said first end portion extending into the torque converter opening, said first end portion including a structure engaging the internal components of the torque converter, said mandrel being circumscribed by the collet of the torque converter when said mandrel extends into the torque converter;

b. a support element including an open hollow end portion fitting over the collet and said second end portion of said mandrel circumscribed by the collet;

c. a bushing interposed said support element and the collet;

d. a fastener for holding said mandrel to said support element; and e. holding means for retaining said open hollow end portion of said support element, said bushing, and the collet in a sandwich configuration.

2. The combination of claim 1 in which said holding means comprises a threaded end portion formed on an outer surface of said support element, and a member possessing a threaded portion threadingly engaging said threaded end portion formed on said outer surface of said support element.

3. The combination of claim 2 in which said member possessing the threaded portion of said holding means comprises an annular member including an inner surface and an outer surface, said inner surface of said annular member including said threaded portion of said member of said holding means.

4. The combination of claim 1 in which said fastener includes an elongated member extending from said second end portion of said support element to engage said mandrel in said open hollow end portion of said support element.

5. The combination of claim 1 in which said open hollow end portion of said support element includes a flared opening possessing a plurality of flexible fingers being capable of pressing against said bushing when said holding means retains said support element, said bushing, and the collet in a sandwich configuration.

6. The combination of claim 1 in which said fastener for holding said mandrel to said support element includes a threaded screw.

* * * * *